(12) United States Patent
Shima et al.

(10) Patent No.: US 6,702,216 B2
(45) Date of Patent: Mar. 9, 2004

(54) TAPE CARTRIDGE

(75) Inventors: Motohiko Shima, Tokyo (JP); Akio Momoi, Tokyo (JP); Hiroshi Kaneda, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/130,838

(22) PCT Filed: Sep. 20, 2001

(86) PCT No.: PCT/JP01/08189

§ 371 (c)(1),
(2), (4) Date: May 21, 2002

(87) PCT Pub. No.: WO02/25663

PCT Pub. Date: Mar. 28, 2002

(65) Prior Publication Data

US 2002/0170998 A1 Nov. 21, 2002

(30) Foreign Application Priority Data

Sep. 22, 2000 (JP) .................................. 2000-288592

(51) Int. Cl.[7] .............................................. G11B 23/107
(52) U.S. Cl. ................................................... 242/348.2
(58) Field of Search .......................... 242/338.1, 348, 242/348.2, 348.3, 348.4; 360/132, 133; 369/291

(56) References Cited

U.S. PATENT DOCUMENTS 5,927,633 A * 7/1999 McAllister ............... 242/348.2
6,125,012 A * 9/2000 Miyazaki et al. ........... 360/133
6,349,892 B2 * 2/2002 Morita et al. ............. 242/347.1

FOREIGN PATENT DOCUMENTS

| EP | 0924702 A1 | 6/1999 | |
|----|------------|--------|---|
| EP | 1058259 A2 * | 12/2000 | ......... G11B/23/027 |
| JP | 9-245458 | 9/1997 | |
| JP | 10-64222 | 3/1998 | |
| JP | 11-328922 | 11/1999 | |
| JP | 2001057047 A * | 2/2001 | ......... G11B/23/107 |

* cited by examiner

Primary Examiner—Kathy Matecki
Assistant Examiner—Scott J. Haugland
(74) Attorney, Agent, or Firm—Wood, Phillips, Katz, Clark & Mortimer

(57) ABSTRACT

A tape cartridge comprising: a housing; a single tape reel carrying a length of tape having an outer end fixed to a leader pin, which can be taken out of the cartridge through an outlet formed in the housing by a tape draw-out member of a recording-reproducing apparatus; a door member covering the outlet; and a spring member pushing the door member towards the closed position. The spring member is a torsion coil spring comprising: two coil portions; a connecting portion linking the two coil portions; a first arm portion that extends from one coil portion, forms a first angle with the connecting portion, and has an end abutting the housing; and a second arm portion that extends from the other coil portion, forms a second angle with the connecting portion pointing in opposite direction to the first angle, and has an end fixed to the door member.

4 Claims, 7 Drawing Sheets

TAPE CARTRIDGE

FIELD OF THE INVENTION

The present invention relates to a single-reel type tape cartridge for use with magnetic recording-reproducing apparatus, especially a tape cartridge having a door member covering a tape outlet in the housing.

PRIOR ART

With respect to a single-reel type tape cartridge for use with magnetic recording-reproducing apparatus, Japanese Patent Application Kokai 11-328,922 describes a door member covering a tape outlet in a housing, used with a torsion coil spring in which two coil portions are connected in tandem, thereby applying force to the door member in the direction of closing. With this coil spring, the distance between two coil portions as well as the distance from each coil portion to the respective end of the spring are kept small as compared with the case of a torsion spring having one coil portion. Therefore, when the door member is opened or closed, the distance of the door movement, without the spring being brought into contact with the upper or lower wall of the housing, becomes longer.

Briefly, in the prior art (FIG. 7), a door member 7 is provided to cover the tape outlet extending over the upper housing 1 and the lower housing 2; two coil portions 110 and 112 are connected with each other via a medium arm portion 114; an arm portion 113 extending from the coil portion 110 is fixed to the housing, and the other arm portion 115 extending from the coil portion 112 is fixed to the door member 7, so that the door member 7 is constantly pushed by the coil spring towards the closed position. When the door member 7 is pushed in the door-opening direction by the means equipped in the apparatus, each of the spring arm portions 113 and 115 moves using the respective ends of the arm as a fulcrum, thereby allowing the door member 7 to move to the opened position. The height of the spring is lower as compared with that of the spring with one coil portion, which allows larger moving distance of the door member 7 as compared with the case of the spring with one coil portion, in the cartridge having the smaller space between the upper wall and the lower wall.

Problems to be Solved by the Invention

However, in the structure of the door disclosed in Japanese Patent Application Kokai 11-328,922, the coil portions 110 and 112 are arranged in tandem, and thus the distance between them are kept constant while the door member is shifting its position. As the result, when the door member 7 is in opened position, relatively large space is required for the spring in the housing. In addition, in the case of a smaller cartridge in which the perpendicular movement of the coil portion relative to the direction of the sliding of the door member (i.e. upward or downward movement relative to the cartridge) is limited, portions of the door member or the housing may be subjected to abrasion by the arm portions of the spring, as the opening-closing movement of the door member is repeated.

Therefore, it is desired to provide a force-adding spring that allows the door member to move in wider range, while the spring occupies smaller space.

Means to Solve the Problem

The problem mentioned above will be solved by providing the cartridge having a torsion coil spring of the present invention. Specifically, the present invention provides a tape cartridge including a housing, a single tape reel turnably held within the housing, said tape reel carrying a length of tape wound thereon, the outer end of the tape being fixed to a leader member in the form of pin, which can be taken out of the cartridge through an outlet formed in the housing by a tape draw-out member of a recording-reproducing apparatus, a door member covering said outlet, and a spring member pushing said door member towards the closed position, wherein said spring member is a torsion coil spring comprising two coil portions; a connecting portion linking said two coil portions; a first arm portion that extends from one of said coil portions forming a first angle relative to said connecting portion and has an end abutting the housing; and a second arm portion extending from the other of said coil portions, forming a second angle relative to said connecting portion, said second angle pointing in a direction opposite to said first angle and having an end fixed to said door member.

With this construction, the interference by two coil portions is prevented, and smooth opening/closing of the door member is attained, even though the space for the torsion coil spring is small.

Preferably, the first arm portion is longer than the second arm portion.

With this construction, when the door member is opened, said first arm portion abutting the housing is deformed at first, and then said second arm portion fixed to the door member is deformed, thereby keeping the initial driving force for opening the door member small.

Preferably, among the arm portions, the first arm portion abutting the housing has an end in the form of a coil.

With this construction, abrasion of the housing can be prevented.

Preferably, the portion of the door member to which the spring member is fixed is provided with a hood that prevents the spring member from being brought into contact with the upper wall of the housing.

Preferably, the housing has a second abutting portion which functions as a fulcrum at the position apart from the above-mentioned abutting portion of the housing for the first arm portion, during the late stage of the deformation of the first arm portion, thereby shortening the effective length of the first arm portion, which allows the second arm portion to be deformed as the door member is opened.

Best Mode for Carrying Out the Invention

FIG. 1 shows an exploded perspective view of the tape cartridge according to one embodiment of the present invention.

The cartridge comprises a housing composed of the upper housing 1 and the lower housing 2, within which a single tape reel 3 is turnably held.

The lower housing 2 has an opening 21 through which a drive shaft of the apparatus is inserted. In the upper housing 1 and the lower housing 2, notches 12 and 22 are formed respectively, and they together form a tape outlet 100.

A tape reel 3 comprises an upper flange 31, a lower flange 33 and a hub 32, the latter two of which are integrally formed together. On the bottom of the hub 32, a metal plate 34 is embedded. On the bottom side of the hub 32 surrounding the metal plate 34, there formed dents arranged in circle (not shown) to engage with the drive shaft of the apparatus. Since the end of the tape is directly adhered to the outer surface of the hub by means of water or the like, the hub has no member for securing the tape.

The inner surface of the hub 32 has engage dents 35, which engage with a brake lock 5, thereby preventing undesired rotation of the tape reel 3 when the cartridge is not in use.

The bottom side of the brake lock 5 has engage dents 51, which engage with the dents 35 of the hub 32. The brake lock 5 is constantly pushed to the braking position by a brake spring 4. A guided projection 52 of the brake lock 5 is allowed to securely move upward or downward (to the braking position or to the brake-releasing position) by a position-regulating part 13 formed in the inner side of the upper housing 1.

Between the hub 32 and the brake lock 5, a brake-releasing plate 9 is inserted.

The brake-releasing plate 9 is composed of a main plate 91 and legs 92. Each of the legs 92 is inserted in the hole 36 on the bottom plate of the hub 32, and when the cartridge is applied to the apparatus, the legs 92 of the brake-releasing plate 9 are lifted upward, which leads to the upward lift of the brake lock 5, thereby releasing the engagement with tape reel 3 to allow the tape reel 3 to turn.

The outer end of the tape T is fixed to the leader member 8. The leader member 8 is composed of a pin member 81 and a C-shaped damp 82. The tape T is wound around the pin member 81, and the C-shaped damp 82 is snap-fitted over the pin, with the tape end portion in between, thereby fixing the tape. When the cartridge is applied to the apparatus, the leader member 8 is held by a holding member of the apparatus, and then the tape T can be taken out.

A tape outlet 100 is covered with a door member 7. The door member 7 is constantly pushed by a spring member 6 towards the position at which the door member closes the tape outlet 100.

FIG. 2 shows a plan view of the spring member 6 of the present invention.

The spring member 6 is composed of first and second coil portions 61 and 62; a connecting portion 65 linking these coil portions 61 and 62; a first arm portion 64 extending from the first coil portion 61 (length: X); and a second arm portion 63 extending from the second coil portion 62 (length: r). As a whole, the spring member 6 is in the shape of N. The diameters of the two coil portions 61 and 62 are approximately the same, and the first arm portion 64 is longer than the second arm portion 63 (X>r).

The first arm portion 64 has a bend portion 68 in between the ends of the arm portion and a small coil portion 67 at the end, which abuts the spring-abutting portion 24 of the lower housing 2 (FIG. 4). As will be mentioned below, the abutting portion 24 has a first abutting portion which is a corner formed by the abutting portion and the housing inner surface, and a second abutting portion which is the top of the abutting portion. The end of the second arm portion 63 has a U-shaped bend portion 66.

FIG. 3 shows a perspective view of the door member 7. (a) shows a view from the outside, and (b) shows a view from the inside.

The door member 7 has a main body 71; a projection 72 to be operated by the apparatus; and a portion 73 on which the spring is mounted. When seen from the inside of the door member, the portion 73 is one step lower as compared with the inner surface of the door, and as a result, the hood 74 is formed on the upper side of the portion 73. In the portion 75 to which the spring is fixed, a mount hole 75a is formed in the vertical direction, through which the bend portion 66 of the second arm portion 63 is inserted. The outer surface of the portion 73 has the hole 75b, which is formed for shaping the mount hole 75a. In other words, among the four side walls of the hole 75b, the upper wall has an opening connected to the hole 75a.

FIG. 4 shows a side view seen from inside of the housing wherein the spring member 6 is fixed to the door member 7. Because of the presence of the hood 74, the end of the bend portion 66 of the spring member 6 cannot shift upwardly further, even when the door member 7 slides. As a result, the end of the spring member cannot abrade the inner surface of the housing.

The movement and effect of the spring member 6 in the cartridge in which the above-mentioned door member 7 and spring member 6 are assembled will be explained with reference to FIG. 5. FIG. 5(a)–FIG. 5(d) show steps of the movement of the torsion coil spring member 6 upon opening the door member towards left.

FIG. 5(a) shows a condition in which the door member 7 is closed. The coil portion at the end of the first arm portion 64 is abutting against the corner at the base of the abutting portion 24. The first arm portion 64 is longer than the second arm portion 63, and when the spring is assembled in the cartridge, the angle θ1 formed by the first arm portion 64 and the connecting portion 65 is smaller than the angle θ2 formed by the second arm portion 63 and the connecting portion 65. This is because both arms are in equilibrium position where moments of force for both arms are identical.

As the door member 7 begins to open as shown in FIG. 5(b), the arm portion angle θ1 on the side of the coil portion 61 becomes smaller while the first coil portion 61 moves past the spring-abutting portion 24 (to the left side in the Figure), and the part of the arm portion 64 between the bend portion 68 and the end comes into contact with the spring-abutting portion 24.

As the door member 7 further opens as shown in FIG. 5(c), firstly the part of the first arm portion 64 between the bend portion 68 and the end comes to abut with the upper edge of the spring-abutting portion 24. As the result, the abutting point functions as a fulcrum and the first arm portion 64 begins to deform. Subsequently, the coil portion 67 at the end of the first arm portion begins to move towards the side of the tape outlet, and the first coil portion 61 further shifts towards the backside at the same time. Since the effective length of the first arm portion 64 becomes shorter than the length of the second arm portion 63, the first arm portion cannot make large movement, and instead, the second arm portion 63 begins to deform. When a wall 25 is formed behind the portion 24, the first coil portion 61 is brought into contact with the wall 25 at about the same time as the bend portion 68 of the first arm portion 64 is brought into contact with the upper edge of the spring-abutting portion 24, which limits the further movement of the first coil portion 61.

During the process shown in FIG. 5(b)–(c), the spring never undergo large deformation, and therefore, sudden increase in the spring force never occurs.

Subsequently, after the first arm portion 64 is brought into contact with the wall 25, the angle θ2 formed by the second arm portion 63 and the connecting portion 65 in turn becomes smaller, as shown in FIG. 5(d). When the door member 7 is fully opened, the second coil portion 62 is seated under the portion 73 of the door member 7.

Since the spring moves as shown above, sudden change in the spring force never occurs during the opening process of the door member 7, and in addition, large stroke can be attained. Further, when the door member 7 is fully opened, the first coil portion 61 retreats fully so that the coil portions never interferes with each other.

FIG. 6 shows a plan view of the lower housing. The spring-abutting portion 24 is formed at the end of the door member guide groove 23 of the lower housing 2. The height should be low so as to allow the first coil portion 61 to shift fully to the back and the bend portion 68 of the first arm portion 64 to be brought into contact with the upper edge of the portion 24. Behind the spring-abutting portion 24, there formed the wall 25 with which the first coil portion 61 can be brought into contact when the door member 7 is opened.

At the end of the first arm portion 64, the coil portion 67 is formed which abuts with the spring-abutting portion 24. The portion 67 in the form of coil allows smooth movement of the spring member 6 along with the movement of the door member 7. In addition, since the coil has a certain width, tilting of the spring member 6 upon assembling the spring member 6 into the housing can be avoided, leading to prevention of the trouble upon covering the lower housing 2 with the upper housing 1.

Effect of the Invention

According to the present invention, stable spring force for door opening/closing can be obtained. In addition, even when the space for the coil spring is small, a certain open/close distance of the door member can be secured.

Since the end of the arm portion abutting the housing is in the form of coil, the abrasion of the housing can be prevented. Further, since the end of the arm portion can be provided with a certain width, tilting of the spring member upon assembling the housing can be avoided.

Since the door member has a hood which prevents the end of the arm portion of the spring member from being brought into contact with the inner surface of the housing, abrasion of the housing by the spring member upon opening/closing the door can be avoided.

Since the housing has a projection which functions as a fulcrum at the position apart from the above-mentioned abutting portion for the first arm portion during the late stage of the deformation of the first arm portion, when the door member opens, firstly the first arm portion abutting the housing begins to deform, and then the second arm portion fixed to the door member begins to deform. As the result, the force required for the initial movement for opening the door member is kept small, and the smooth movement is provided.

BRIEF DESCRIPTION OF THE DRAWINGS

FIG. 3(*b*) shows a perspective view of the door member from the other side.

Each of FIGS. 5(*a*)–(*d*) shows the side view of the key steps representing the opening process of the door member of the cartridge according to one embodiment of the present invention.

Figure 1:
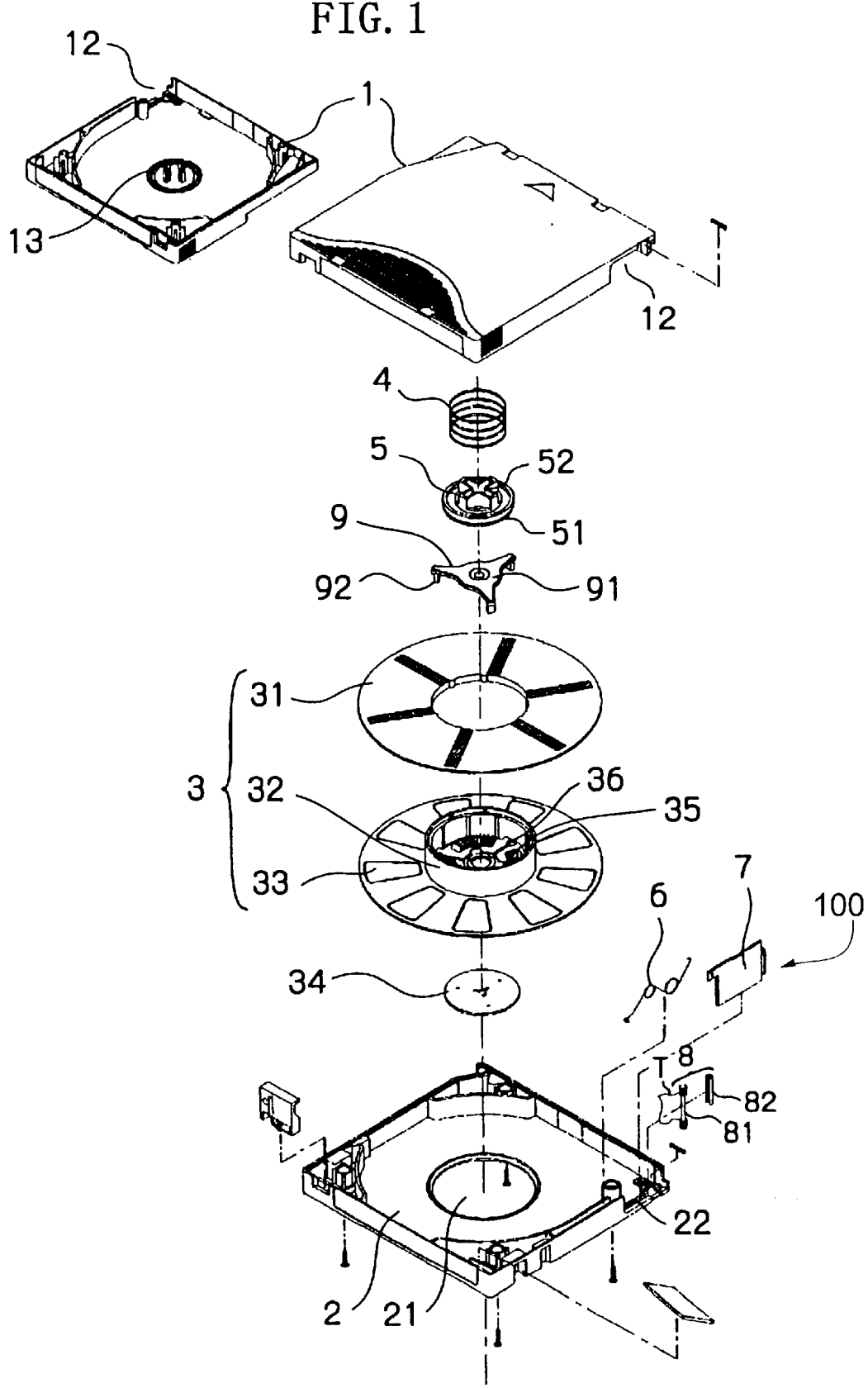
FIG. 1 shows an exploded perspective view of the tape cartridge according to one embodiment of the present invention.
Figure 2:
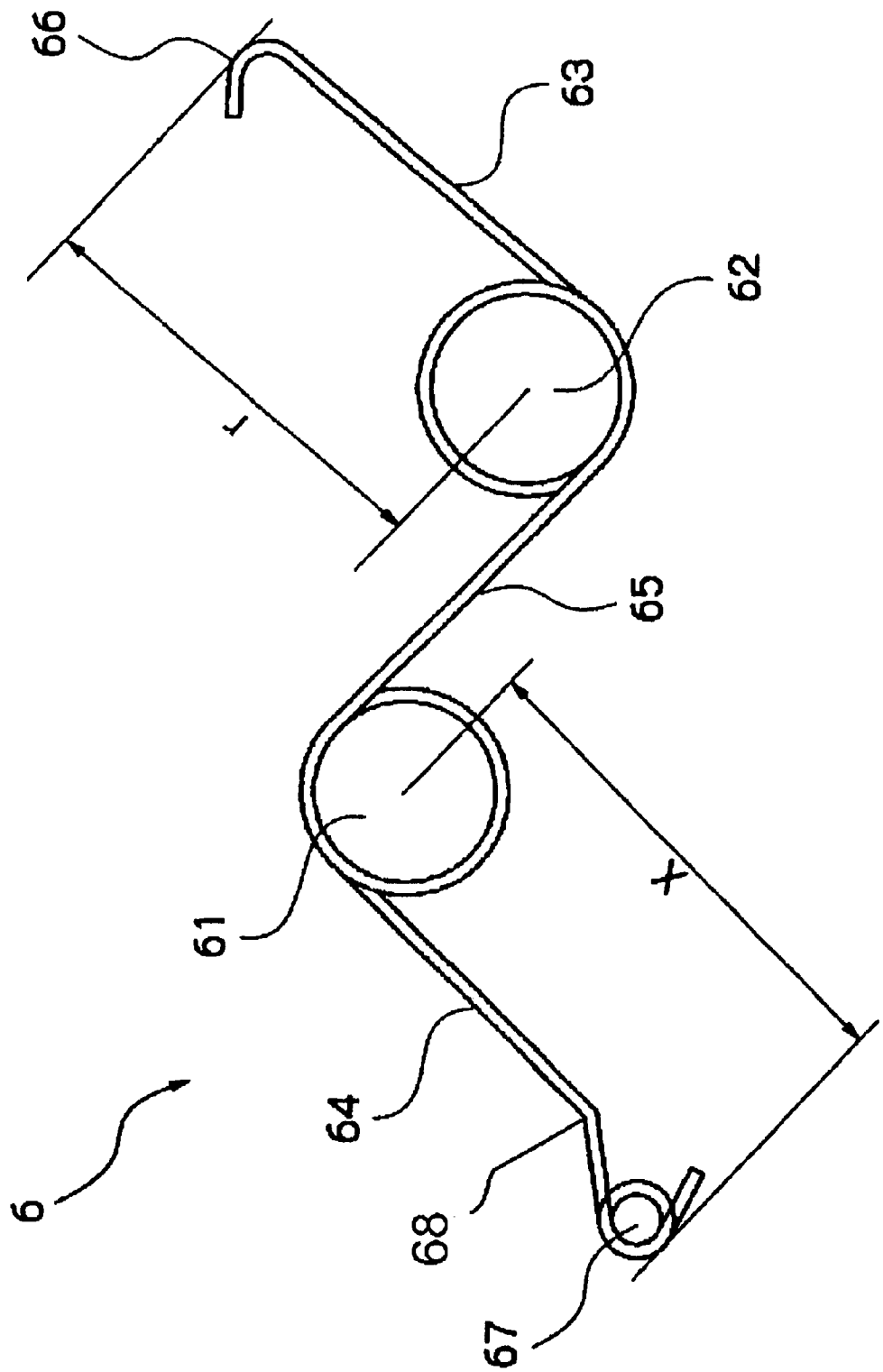
FIG. 2 shows a plan view of the spring member according to one embodiment of the present invention.
Figure 3A:
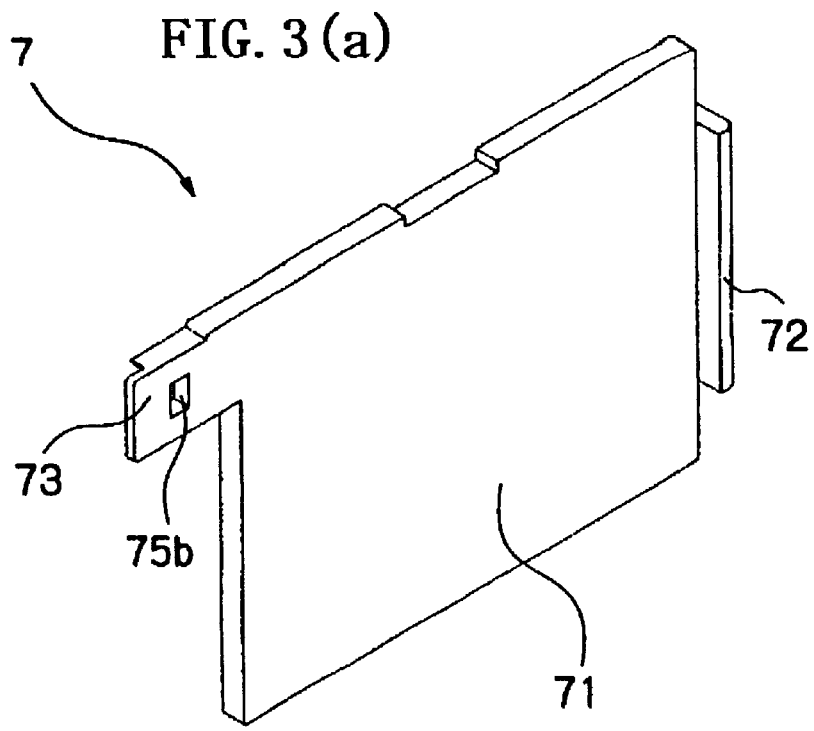
FIG. 3(*a*) shows a perspective view of the door member according to one embodiment of the present invention, from one side.
Figure 3B:
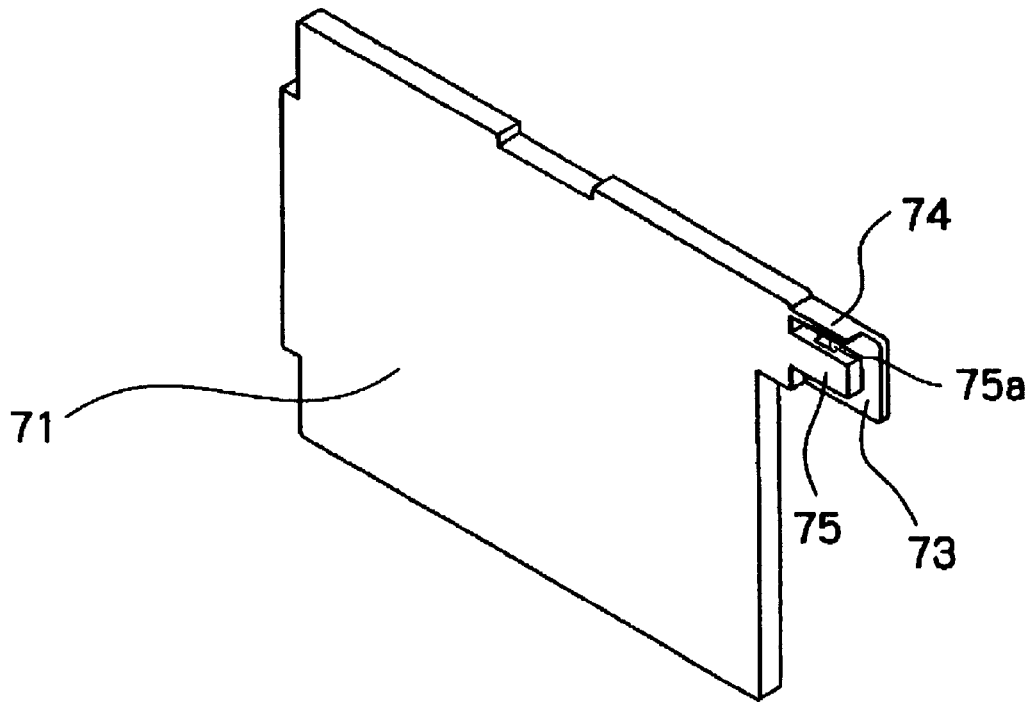
Figure 4:
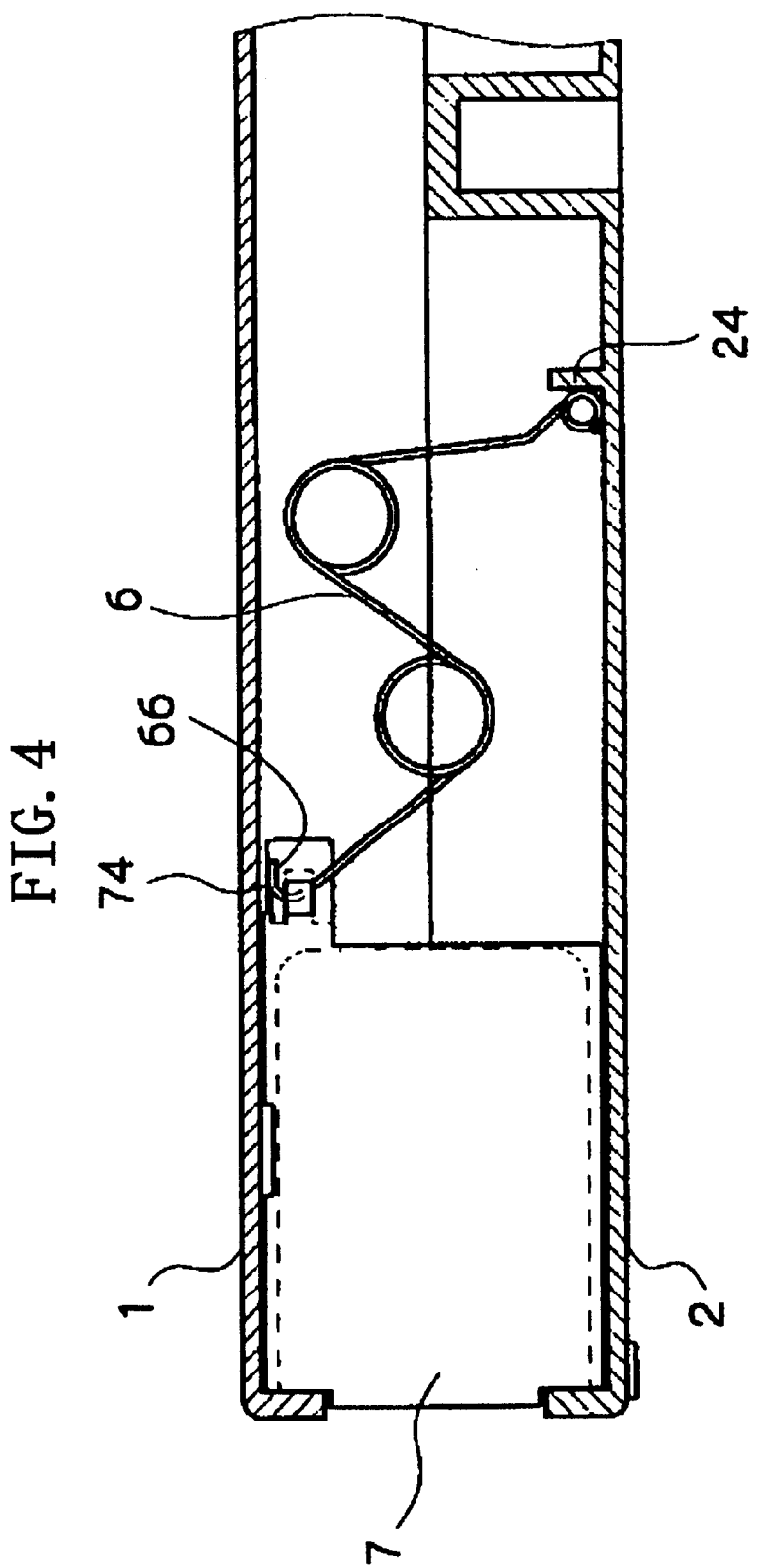
FIG. 4 shows a cross section of the door portion of the cartridge according to one embodiment of the present invention, which is seen from inside.
Figure 5A:
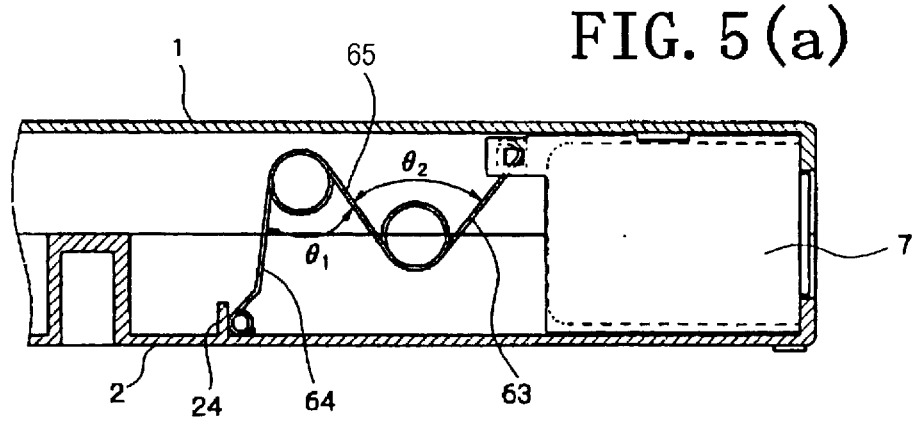
Figure 5B:
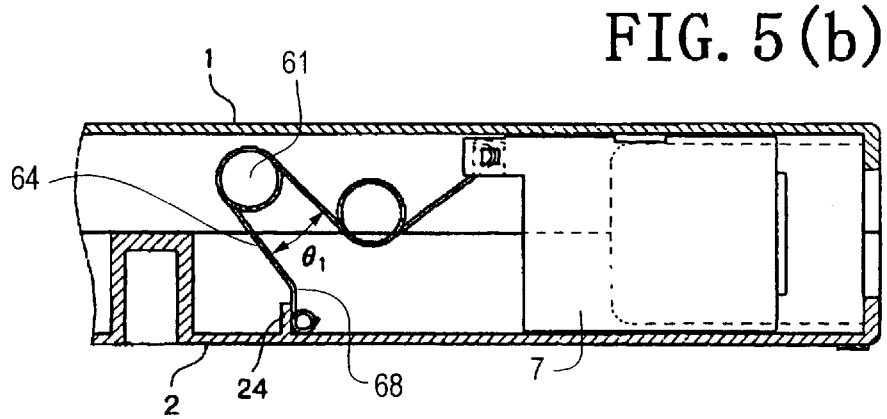
Figure 5C:
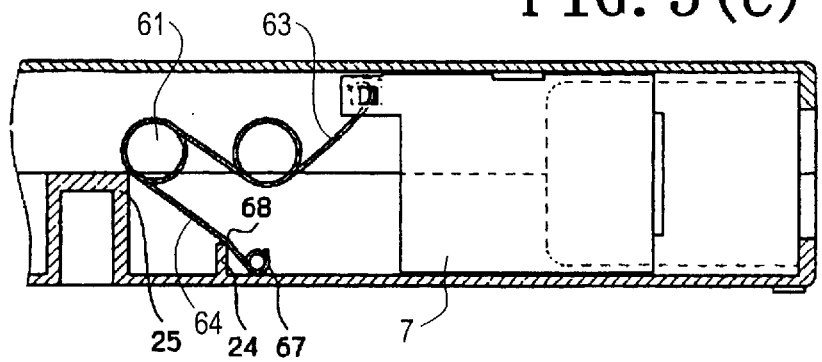
Figure 5D:
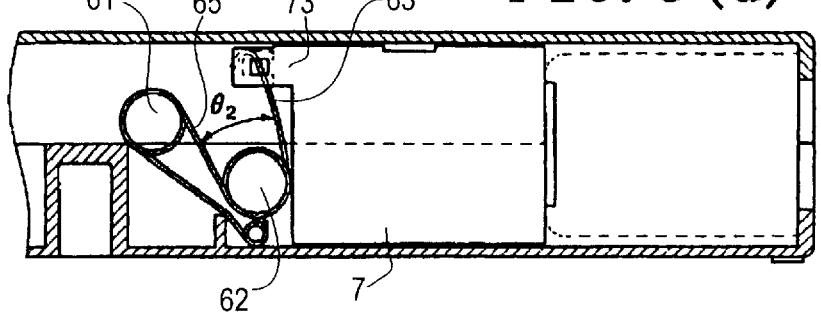
Figure 6:
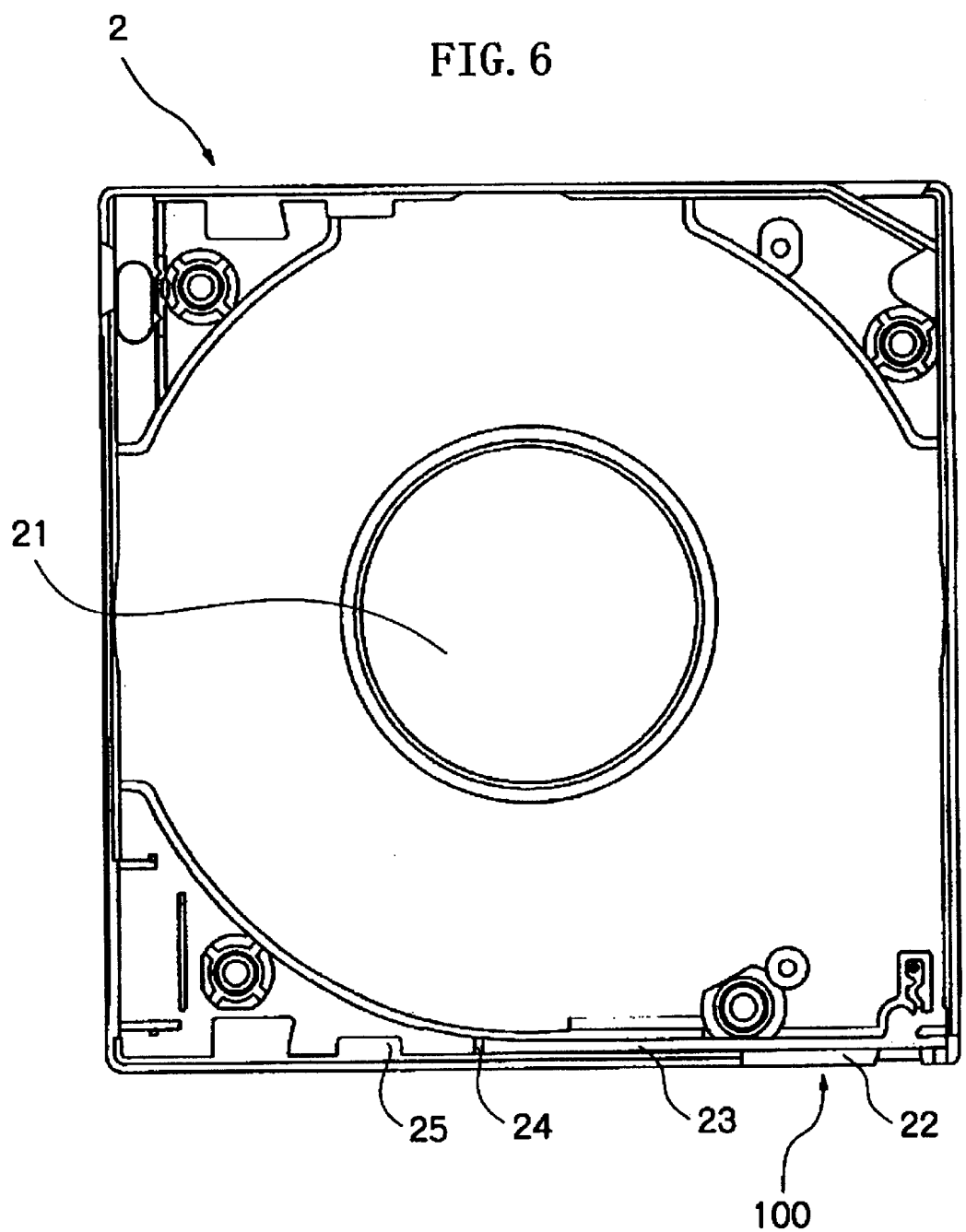

FIG. 6 shows a plan view of the lower housing of the cartridge according to one embodiment of the present invention.

Figure 7:
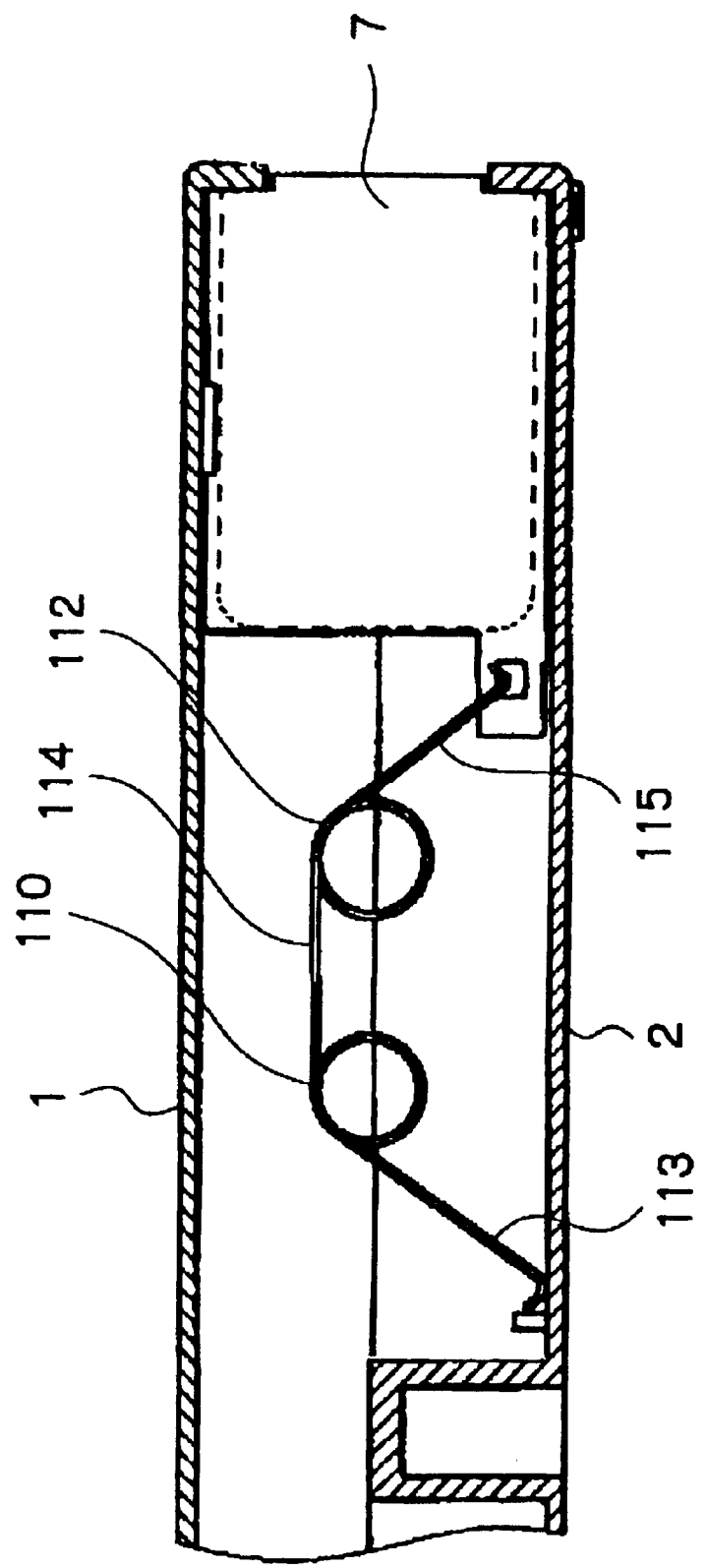

FIG. 7 shows a cross section of the door portion of the conventional cartridge, which is seen from the side of the housing.

What is claimed is:

1. A tape cartridge comprising: a housing; a single tape reel turnably held within the housing, said tape reel carrying a length of tape wound thereon, the outer end of the tape being fixed to a leader member in the form of a pin, which can be taken out of the cartridge through an outlet formed in the housing by a tape draw-out member of a recording-reproducing apparatus; an openable door member covering said outlet; and a spring member pushing said door member towards the closed position; wherein:

said spring member is a torsion coil spring comprising: only two torsion coil portions; a single generally straight connecting portion linking said two coil portions; a first arm portion that extends from one of the coil portions, forming a first angle with said connecting portion, and has an end abutting with a first abutting portion of said housing; and a second arm portion that extends from the other coil portion, forming a second angle with said connecting portion, said second angle pointing in an opposite direction to said first angle, and has an end fixed to said door member, said first arm portion is longer than said second arm portion, such that when the door member is opened, said first arm portion abutting the housing at first deforms, and then said second arm portion fixed to the door member deforms, said housing has a second abutting portion in a position that a part of the first arm portion of the spring comes to contact with the second abutting portion during opening of the door member so that the end of said first arm portion is caused to move toward the outlet out of engagement with the first abutting portion after the contacting, the first and second arm portions and the connecting portion being free of interference of crossing as the door moves between closed and open positions.

2. The tape cartridge according to claim 1, wherein the end of the first arm portion abutting the housing is in the form of a coil.

3. The tape cartridge according to claim 1 wherein the portion of the door member to which the spring member is fixed is provided with a hood extending laterally between the end of the spring and an upper wall of the housing that prevents the spring member from being brought into contact with the upper wall of the housing.

4. The tape cartridge according to claim 1, wherein said second abutting portion functions, during the late stage of the deformation of said first arm portion, as a fulcrum at a position apart from the abutting portion of the housing for the end of said first arm portion, said fulcrum shortening the effective length of the first arm portion so as to allow the second arm portion to be deformed as the door member opens.

* * * * *